United States Patent [19]
Grabowski

[11] Patent Number: 5,291,478
[45] Date of Patent: Mar. 1, 1994

[54] SWITCHING NETWORK WHEREIN SHORT-PATH CONNECTIONS CAN BE SWITCHED

[75] Inventor: Karl-Heinz Grabowski, Groebenzell, Fed. Rep. of Germany

[73] Assignee: Siemens Aktiengesellschaft, Munich, Fed. Rep. of Germany

[21] Appl. No.: 82,955

[22] Filed: Jun. 29, 1993

[30] Foreign Application Priority Data

Aug. 6, 1992 [EP] European Pat. Off. ........ 92113450.8

[51] Int. Cl.$^5$ .............................................. H04Q 3/68
[52] U.S. Cl. .................... 370/58.1; 370/65.5; 340/825.8
[58] Field of Search ............... 370/58.1, 65, 65.5, 370/112; 340/826, 825.8; 379/291, 306, 335

[56] References Cited

U.S. PATENT DOCUMENTS

4,123,624 10/1978 Gagnier et al. .................. 370/65.5
5,198,808 3/1993 Kudo .......................... 379/291 X

FOREIGN PATENT DOCUMENTS

0336302 10/1989 European Pat. Off. .

OTHER PUBLICATIONS

E. I. Melik-Gaikazova, "The Structure of Multigroup Connecting Networks", International Teletraffic Congress, Proc. Paper 313, Jun. 1973, pp. 1-8.
H. Hofstetter et al., "Traffic Behavior of Reversed Link Systems with Short Path Possibilities", 9th International Teletraffic Congress, Oct. 17, 1979, pp. 1-9.
"A Scalable ATM Switching System Architecture", Fischer et al, IEEE Journal of Selected Areas In Communications, vol. 9, No. 8, Oct. 1991, pp. 1299-1307.

*Primary Examiner*—Douglas W. Olms
*Assistant Examiner*—Melvin Marcelo
*Attorney, Agent, or Firm*—Hill, Steadman & Simpson

[57] ABSTRACT

In a modularly structured coupling network in multi-stage reversal grouping wherein short-paths can be switched, a special wiring of the switching modules of the first stage is provided to input and output lines connected to the switching network. This yielding a reduction by one-third of the plurality of switching elements to be provided at these switching modules.

5 Claims, 4 Drawing Sheets

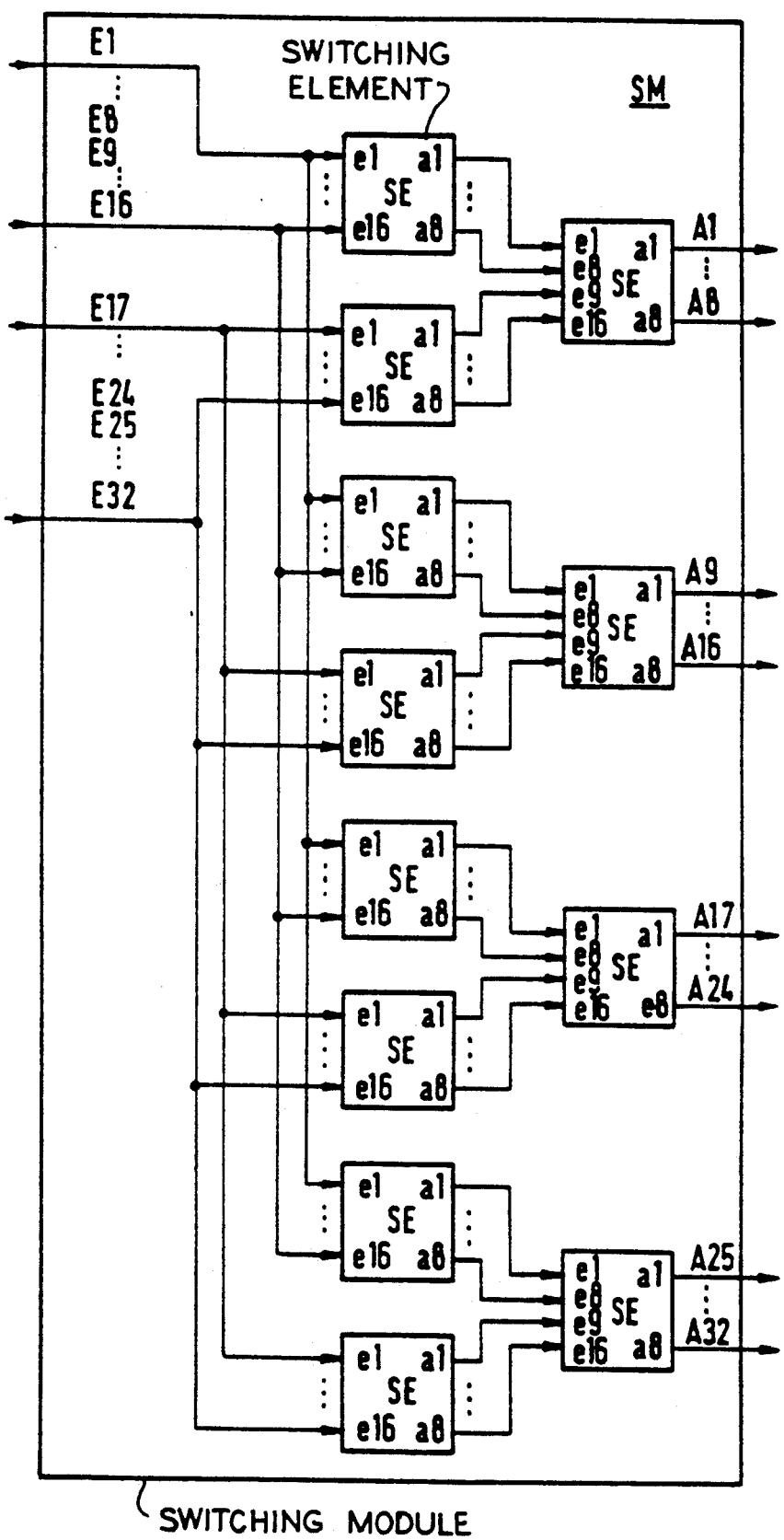

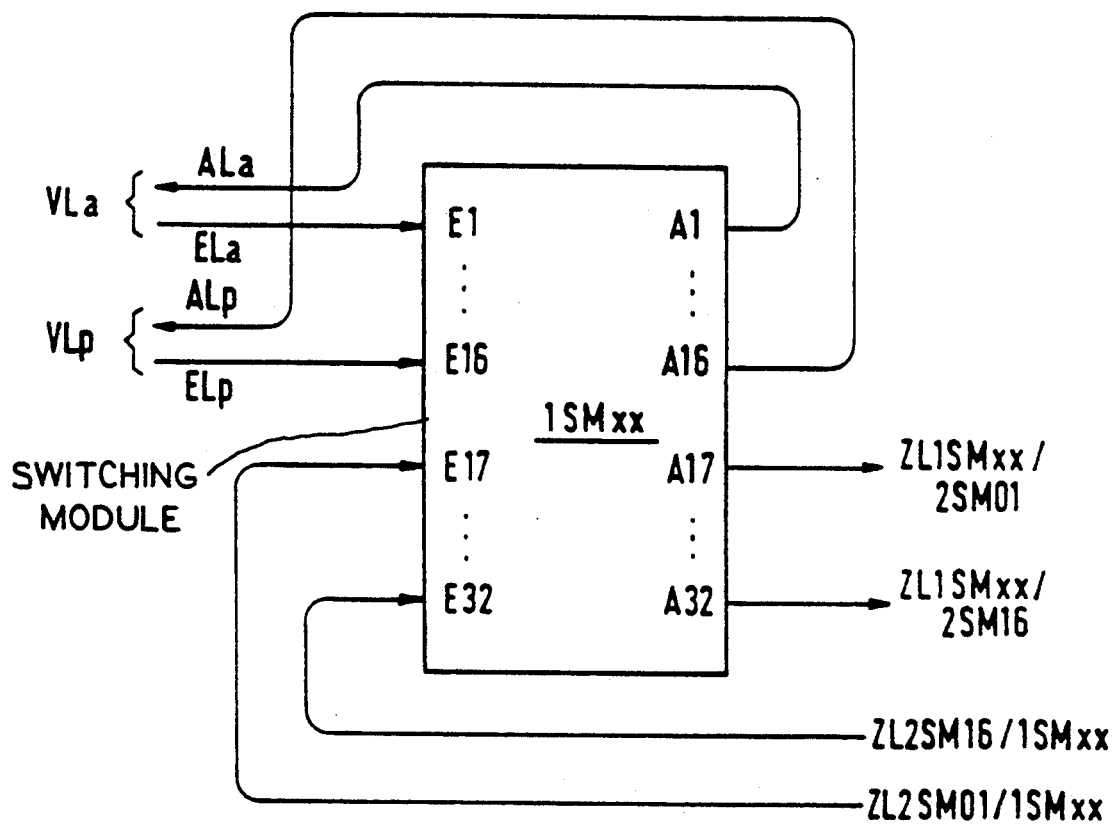

SWITCHING NETWORK WHEREIN SHORT-PATH CONNECTIONS CAN BE SWITCHED

BACKGROUND OF THE INVENTION

In a switching network, a plurality of trunks or links come together in a network node. Switching networks are provided in the network nodes for random connection of the trunks.

For example, IEEE Journal on Selected Areas in Communications, Vol. 9, No. 8, October 1991, discloses a two-stage, modularly constructed switching network in reversal grouping, wherein the switching network is connected to a plurality of duplex trunks each respectively established by a simplex input line and a simplex output line. The switching network is formed by a plurality of switching modules arranged in stages. Every switching module has the same number of simplex inputs as simplex outputs and every simplex input of a switching module is connectable to every simplex output of the same switching module. Every switching module is formed with a plurality of switching elements having twice as many simplex inputs as simplex outputs. The switching elements are arranged in two rows. A switching element of the second row together with two switching elements of the first row whose simplex outputs are connected to the simplex inputs of the switching element of the second row form a switching element group. The simplex inputs of the switching modules of the first stage are connected to the simplex inputs of the switching elements of the first row belonging to the switching module and are available for the connection of input lines. The simplex outputs of a switching module are established by simplex outputs of a switching element belonging to the switching module. For switching short-paths, portions of the simplex inputs and of the simplex outputs of a switching module of the first stage that are of the same size are connected to input or output lines, respectively, that belong to the same trunk, whereas the remaining simplex inputs or simplex outputs are connected to links that deliver signals from switching modules of the second stage or forward signals to switching modules of the second stage. Only output lines or only links are connected to the outputs of one and the same switching element group. This switching network has the capability of switching short-paths in the first stage.

SUMMARY OF THE INVENTION

Upon retention of this capability, the present invention provides a way of specifying a circuit arrangement for a switching module of the first stage of such a switching network that requires an especially low number of switching elements.

In a circuit of the species outlined above, this problem is resolved by adding the features that: the inputs of the one switching element of the first row of a switching element group whose outputs are connected to output lines are only connected to input lines; the inputs of the other switching element of the first row of a switching element group whose outputs are connected to output lines are only connected to links; and a row of additional switching elements is provided, whose inputs are only connected to the input lines and whose outputs are connected to links.

The circuit arrangement of the present invention yields, first, a switchability of short-paths and, second, an outlay that is reduced, for example, by one-third for the plurality of switching elements to be provided in the switching modules of the first stage, whereby connections that are not through-connected via short-paths are switched through the switching network via a reduced plurality of, for example, five instead of previously six switching elements. The reduction in the number of switching elements via which the signals of connections are through-connected is accompanied by a reduction of the processing time and waiting time to be spent overall in the through-connection of these signals through the switching network. Over and above this, the reduced plurality of switching elements results in a reduced power consumption.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 is a block diagram of the traditional circuit arrangement of switching elements in a switching module; and FIG. 4 is a block diagram of further details of the wiring of the inventive switching module of FIG. 1 in the first stage of the switching network of FIG. 2.

DESCRIPTION OF THE PREFERRED EMBODIMENT

Figure 2:
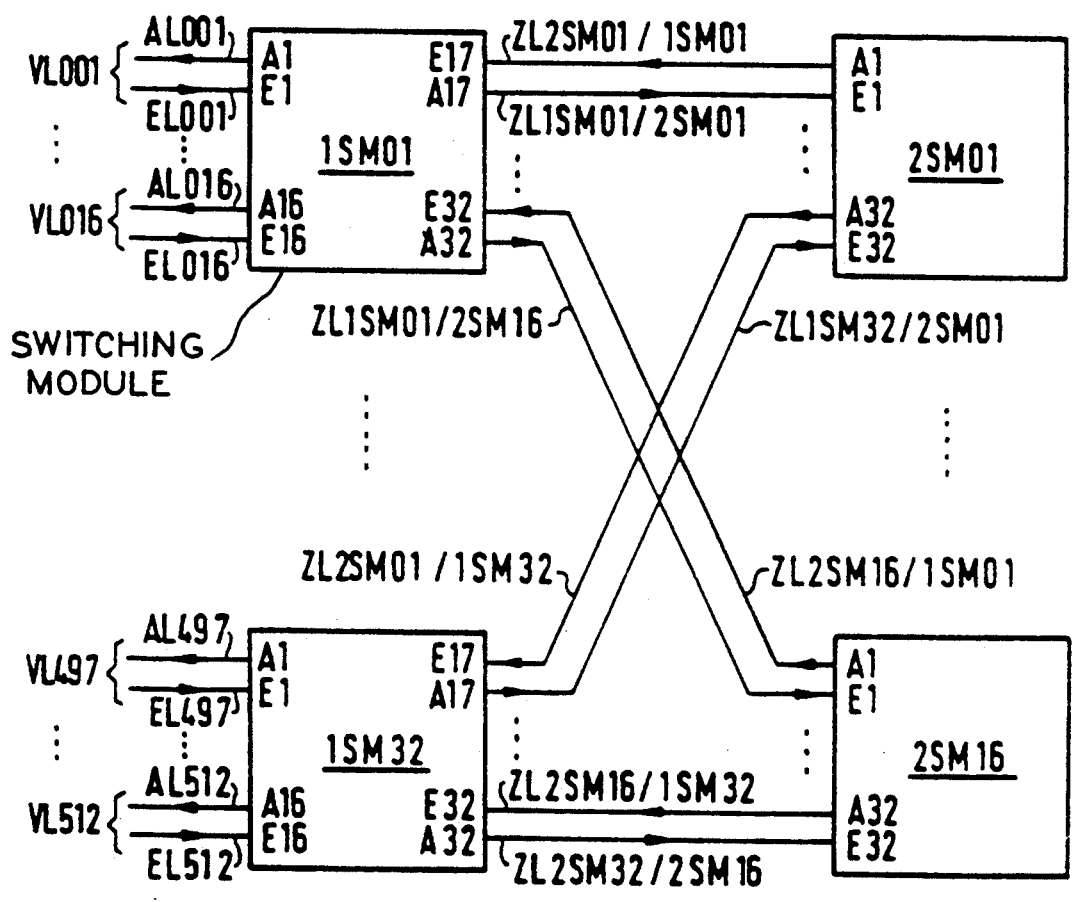
FIG. 2 is a block diagram of a switching network in reversal grouping, whereby the switching modules are arranged in two stages.

FIG. 2 shows a switching network wherein switching modules Sm are arranged in a reversal grouping having two stages. In the exemplary embodiment, the first stage is formed by the switching modules 1SM01 ... 1SM32 and the second stage is formed by the switching modules 2SM01 ... 2SM16. Such a switching network is known from, for example, Journal on Selected Areas in Communications, Vol. 9, No. 8, October 1991, FIG. 7 and FIG. 8, and therefore need not be described in greater detail here. The switching network is connected to a plurality of trunks VL001 ... VL512. At their end that is not shown, the trunks can, for example, be respectively connected to remote switching equipment or to subscriber equipment. A transmission of signals in both transmission directions occurs on the trunks, whereby the signals transmitted on a respective trunk are conducted on an input line EL in the region of the switching network and the signals outgoing from the switching network are conducted on an output line AL in the region of the switching network. The signals can be, for example, message cells transmitted according to an asynchronous transfer mode during the course of virtual connections, the message cells being transmitted at a constant message cell rate. However, let it be expressly pointed out that the circuit arrangement of the present invention is not bound to a specific transmission method.

The trunks are respectively connected to inputs E and outputs A of a switching module 1SM of the first stage of the switching network. The switching modules SM of the switching network each respectively have the same number of inputs E as outputs A. Every input can be through-connected to every output in the individual switching modules. The switching modules 1SM of the first stage are connected to each of the switching modules 2SM of the second stage via respectively two links ZL for each transmission direction. The referencing of the links ZL is formed such that a respective reference indicates the direction of the transmission of signals from a given switching module to a specific switching module of the respectively other stage. The link bearing the reference ZL1SM01/2SM01 thus references the link on which signals are transmitted from the switching module 1SM01 of the first stage to the switching module 2SM01 of the second stage and the link having the reference ZL2SM16/1SM01 references the link on which the signals are transmitted from the switching module 2SM16 to the switching module 1SM01. Every input line can be through-connected to every output line as a result of the given type of interconnection of the switching modules in combination with the through-connectability of every input to every output of a respective switching module.

FIG. 3 shows the more detailed structure of a switching module that is also known from FIG. 5 of the above-identified reference. The switching module SM is formed with a plurality of twelve identical switching elements SE. Each of the switching elements has respectively sixteen inputs e and eight outputs a, i.e. twice as many inputs as outputs. Eight of the switching elements are arranged in the first row and four of the switching elements are arranged in the second row. The outputs of two switching elements of the first row are connected to the inputs of a switching element of the second row. Two switching elements of the first row form a switching element group together with a switching element of the second row whose inputs are connected to the outputs of these two switching elements of the first row. The outputs a of the switching elements of the second row form the outputs A of the switching module. The inputs E of the switching module are connected to the inputs e of every switching element group. The switching elements are known, for example from FIGS. 3 and 4 of the above-described reference. Also, let it be pointed out that the switching elements may have a respective central memory.

A message cell incoming on an input line EL of a trunk VL is supplied to the switching module of all switching elements connected to this input line. With reference to a routing address respectively contained in the message cells, each of these switching elements checks if the message cell under consideration is to be through-connected to an output line that is connected to its outputs. When this is not the case, then the message cell is destroyed. When it is the case, the message cell under consideration is through-connected to the appertaining output and is through-connected to an output line of a trunk, potentially via a plurality of further switching elements. All message cells to be through-connected from a respective input of the switching network to a respective output of the switching network are transmitted via the same path.

A traditional switching network is constructed with identical FIG. 3 switching modules in both stages. The switching modules of the first stage are thereby wired such that one part, for example half the inputs e of respective switching elements of the first row are connected via inputs E of the switching modules, for example, the inputs E1 . . . E8 or, respectively, E17 . . . E24, to input lines EL, for example the input lines EL1 . . . EL8 or, respectively, EL17 . . . EL24 of trunks VL1 . . . VL8 or, respectively, VL17 . . . VL24. The remaining portion of the inputs e are connected via inputs E of the switching module, for example the inputs E9 . . . E16 or, respectively, E25 . . . E32 to links ZL bringing signals from switching modules of the second stage. An equal portion of the outputs A of the switching module as well as inputs E of the switching module are connected to the output lines AL1 . . . AL8 or, respectively, A9 . . . A16 of these trunks VL1 . . . VL8 or, respectively, VL17 . . . VL24. The remaining portion of the outputs of the switching module, for example A17 . . . A32, is connected to links carrying signals to switching modules of the second stage. In addition to providing the possibility of switching short-paths, this wiring of the switching modules provides a balanced load distribution at the outputs a of the switching elements.

Another approach leads to a wiring of the switching modules of the first stage, wherein only input lines of trunks are connected to the input e of a switching element of the first row and wherein only links are connected to the inputs of the respectively other switching element of the appertaining switching element group. A likewise equal portion of outputs of a respective switching module is again connected to the appertaining output lines of the trunks, whereas the remaining portion of outputs are connected to links carrying signals to switching modules of the second stage. It turns out, given this wiring, that the switching function of one of the switching elements of the first row of a respective switching element group, which have links connected to outputs thereof, is superfluous. The reason for this is that the signals incoming from the links are exclusively through-connected to one of the output lines AL. A signal path from a switching module of the second stage via a switching module of the first stage and back to a switching module of the second stage does not exist. Given a dispensibility of respectively one switching element of the first row of a switching element group, the switch function of one of the remaining two switching elements is also dispensable.

Figure 1:
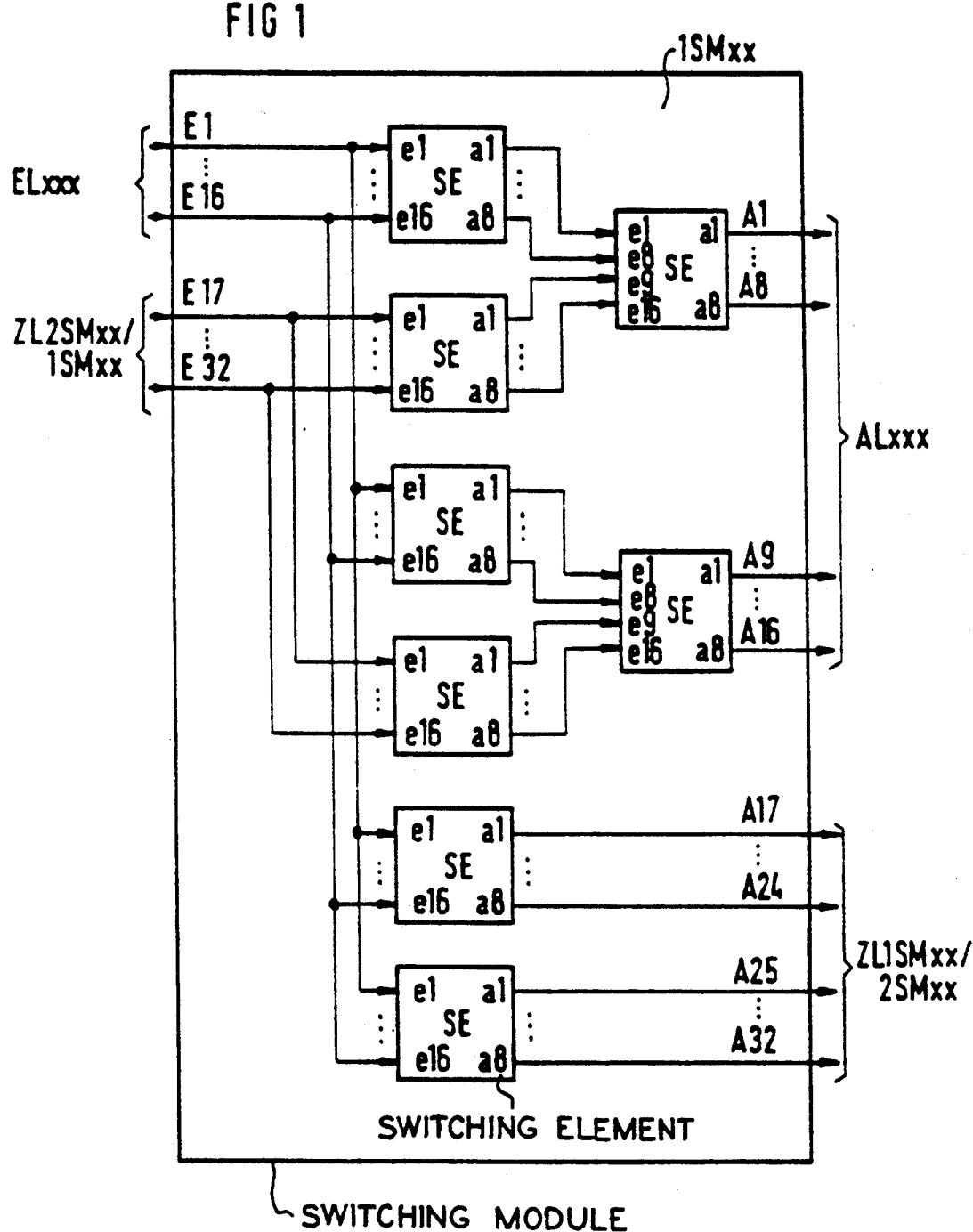
FIG. 1 is a block diagram of the inventive circuit arrangement of switching elements in a switching module of a first stage of a switching network.

FIG. 1 shows the inventive arrangement of switching elements in a switching module of the first stage. Compared to the switching module of FIG. 3, the switching module of FIG. 1 has a plurality of switching elements SE that is reduced by four. The outputs of the switching elements of the second row of the two upper switching element groups are connected to output lines ALxxx of trunks VLxxx. Respectively one switching element of the two upper switching element groups has its input side connected only to input lines, whereas the respectively other switching element has its input side connected to links ZL2SMxxx/1SMxx bringing signals from switching modules of the second stage. The two lower switching elements have their inputs e connected to the input lines ELxxx. The outputs of the two lower switching elements are connected to links ZL1SMxx/2SMxx carrying signals to switching modules of the second stage. When a signal connection of trunks connected to the same switching module of the first stage is to be produced, then the establishment of a short-path is possible upon omission of the route over a switching module of the second stage. Thus, given the establishment of a short-path, a signal brought to a switching module of the first stage on a trunk is through-connected onto a trunk connected to the same switching module. Assuming a uniform traffic distribution of the overall traffic supplied to the switching network, then viewed statistically the fraction of a switching module of the first stage from the total number of switching modules of the first stage of the overall traffic devolves onto short-paths. Thus, when a plurality g of 32 switching modules 1SM01 . . . SM32 are provided in the first stage of a switching network, then 1/32 of the overall traffic devolves onto short-paths. The remaining fraction of (g−1)/g of the overall traffic devolves onto connections wherein the participating trunks are connected to different switching modules. In this case, the signals of these trunks are first supplied via the appertaining switching module of the first stage to a switching module of the second stage and, supplied from the latter via the switching module of the first stage to which the appertaining output line is connected, are supplied to this output line.

FIG. 4 shows the wiring of an inventive switching module 1SMxx of the first row. Half of the inputs E1 . . . E32 and half of the outputs A1 . . . A32 of the switching module are connected to input lines ELa . . . ELp and output lines ALa . . . ALp, respectively, of respective trunks VLA . . . VLp. These output lines are thereby connected to the outputs of the two switching element groups shown in FIG. 1 inside the switching module. The other half of the inputs, that is, E17 . . . E32, are connected to links ZL2SM01/1SMxx . . . ZL2SM16/1SMxx that carry signals from switching modules 2SM01 . . . 2SM16 of the second stage to the switching modules 1SMxx. The other half of the outputs, that is, A17 . . . A32, of the switching module 1SMxx are connected to links ZL1SMxx/2SM01 . . . ZL1SMxx/2SM16 that carry signals from the switching module 1SMxx to the switching modules 2SM01 . . . 2SM16 of the second stage.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for a switching network, the switching network being connected to a plurality of duplex trunks, each of the duplex trunks having a simplex input line and a simplex output line, comprising:

the switching network being formed by a plurality of switching modules arranged in stages;

every switching module of the plurality of switching modules having the same number of simplex inputs as simplex outputs;

every simplex input of a switching module being connectable to every simplex output of the same switching module;

every switching module being formed by a plurality of switching elements, each of the switching elements of the plurality of switching elements having twice as many simplex inputs as simplex outputs, the switching elements arranged in first and second rows and a respective switching element of the second row together with two switching elements of the first row whose simplex outputs are connected to simplex inputs of the respective switching element of the second row forming a switching element group;

the simplex inputs of a respective switching module of the first stage connected to the simplex inputs of the switching elements of the first row belonging to the respective switching module and available for the connection of input lines;

the simplex inputs of a respective switching module are established by simplex outputs of a further respective switching element belonging to the respective switching module;

for switching short-paths, an equal portion of the simplex inputs and the simplex outputs of a switching module of the first stage being connected to input and output lines, respectively, belonging to a respectively same trunk, a remaining portion of the simplex inputs and a remaining portion of the simplex outputs of the switching module of the first stage being connected to links that bring signals from switching modules of the second stage or, respectively, forward signals to switching modules of the second stage;

only one of output lines and links being connected to an output of a respective switching element group;

inputs of one switching element of the first row in a respective switching element group that has outputs of a respective matching element of the second row connected to output lines being only connected to input lines;

inputs of the other switching element of the first row in the respective switching element group that has outputs of a respective switching element of the second row connected to output lines being only connected to links; and a further row of two additional switching elements, each of the two additional switching elements having its inputs connected only to input lines and having its outputs connected only to links.

2. The circuit arrangement for a switching network according to claim 1, wherein half of the simplex inputs of a switching module of the first stage are connected to simplex input lines of the respective trunks and half of the simplex outputs of a switching module of the first stage are connected to simplex output lines of the respective trunks, a respective pair of a simplex input and a simplex output of the switching module of the first stage being connected to a simplex input line and a simplex output line, respectively, of a respective duplex trunk.

3. A circuit arrangement for a switching network, the switching network being connected to a plurality of duplex trunks, each of the duplex trunks having a simplex input line and a simplex output line, the switching network being formed with a plurality of switching modules arranged in stages, every switching module of the plurality of switching modules having the same number of simplex inputs as simplex outputs and every simplex input of a switching module being connectable to every simplex output of the same switching module, comprising:

every switching module being formed by a plurality of switching elements, each of the switching elements of the plurality of switching elements having twice as many simplex inputs as simplex outputs, the switching elements being arranged in two rows, and a respective switching element of the second row together with two switching elements of the first row whose simplex outputs are connected to the simplex inputs of the respective switching element of the second row forming a switching element group;

for switching short-paths, an equal portion of the simplex inputs and the simplex outputs of a switching module of the first stage being connected to input and output lines, respectively, belonging to a respectively same trunk, and a remaining portion of the simplex inputs and a remaining portion of the simplex outputs, of the switching module of the first stage being connected to links that bring signals from switching modules of the second stage or, respectively, forward signals to switching modules of tee second stage;

simplex inputs of one switching element of the first row of a respective switching element group that has outputs of a respective switching element of the second row connected to output lines being only connected to input lines;

simplex inputs of the other switching element of the first row of the respective switching element group that has outputs of a respective switching element of the second row connected to output lines being only connected to links; and a further row of two additional switching elements, each of the two additional switching elements having its inputs connected only to input lines and having its outputs connected only to links;

wherein the simplex inputs of a respective switching module of the first stage are connected to the simplex inputs of the switching elements of the first row belonging to the respective switching module and are available for the connection of input lines, and wherein the simplex outputs of the respective switching module are established by simplex outputs of predetermined switching elements in the first and second rows belonging to the respective switching module.

4. The circuit arrangement for a switching network according to claim 3, wherein for each of the switching modules of the first stage, half of the simplex inputs and half of the simplex outputs are connected to simplex input lines and simplex output lines, respectively, of the trunks, and wherein for each of the switching modules of the first stage, the other half of the simplex inputs and the other half of the simplex outputs are connected to links that interconnect switching modules of the first stage and switching modules of the second stage of the switching network.

5. A circuit arrangement for a switching network, the switching network being connected to a plurality of duplex trunks, each of the duplex trunks having a simplex input line and a simplex output line, comprising:

the switching network being formed with a plurality of switching modules arranged in stages, every switching module of the plurality of switching modules having the same number of simplex inputs as simplex outputs and every simplex input of a switching module being connectable to every simplex output of the same switching module;

every switching module being formed by a plurality of switching elements, each of the switching elements of the plurality of switching elements having twice as many simplex inputs as simplex outputs, the switching elements being arranged in two rows, and a respective switching element of the second row together with two switching elements of the first row whose simplex outputs are connected to the simplex inputs of the respective switching element of the second row forming a switching element group;

for switching short-paths, an equal portion of the simplex inputs and the simplex outputs of a switching module of the first stage being connected to input and output lines, respectively, belonging to a respectively same trunk, and a remaining portion of the simplex inputs and a remaining portion of the simplex outputs, of the switching module of the first stage being connected to links that bring signals from switching modules of the second stage or, respectively, forward signals to switching modules of the second stage;

simplex inputs of one switching element of the first row of a respective switching element group that has outputs of a respective switching element of the second row connected to output lines being only connected to input lines;

simplex inputs of the other switching element of the first row of the respective switching element group that has outputs of a respective switching element of the second row connected to output lines being only connected to links;

a further row of two additional switching elements, each of the two additional switching elements having its inputs connected only to input lines and having its outputs connected only to links;

simplex inputs of a respective switching module of the first stage are connected to simplex inputs of the switching elements of the first row belonging to the respective switching module and are available for the connection of input lines, and simplex outputs of the respective switching module are established by simplex outputs of predetermined switching elements in the first and second rows belonging to the respective switching module; and for each of the switching modules in the first stage, half of the simplex inputs and half of the simplex outputs are connected to simplex input lines and simplex output lines, respectively, of the trunks, and the other half of the simplex inputs and the other half of the simplex outputs are connected to links that interconnect switching modules of the first stage and switching modules of the second stage of the switching network.

* * * * *